United States Patent [19]
Mhedhbi

[11] Patent Number: 5,205,573
[45] Date of Patent: Apr. 27, 1993

[54] BICYCLE THAT CAN BE DISASSEMBLED IN A VERY COMPACT ARRANGEMENT

[76] Inventor: Sghaier Mhedhbi, 5540, 5th Avenue, Montréal, Québec, Canada, H1Y 2S7

[21] Appl. No.: 870,090

[22] Filed: Apr. 17, 1992

[51] Int. Cl.$^5$ .................... B62K 15/00; B65D 85/68
[52] U.S. Cl. .................... 280/287; 280/278; 280/639; 206/335
[58] Field of Search .................... 280/287, 278, 639; 206/335

[56] References Cited

U.S. PATENT DOCUMENTS

| | | | |
|---|---|---|---|
| 640,680 | 1/1900 | Merrow | 280/287 |
| 3,608,917 | 9/1971 | Cogliano | 280/7.16 |
| 3,886,988 | 6/1975 | Garrett et al. | 150/52 |
| 3,979,136 | 9/1976 | Lassiere | 280/278 |
| 4,149,634 | 4/1979 | Lewis, Jr. et al. | 206/335 |
| 4,353,464 | 10/1982 | Bentler | 206/335 |
| 4,390,088 | 6/1983 | Brenner | 206/335 |
| 4,441,729 | 4/1984 | Underwood | 280/278 |
| 4,540,190 | 9/1985 | Moulton | 280/278 |
| 4,598,923 | 7/1986 | Csizmadia | 280/287 |
| 4,756,542 | 7/1988 | Yang | 280/278 |
| 4,792,039 | 12/1988 | Dayton | 206/304 |
| 4,892,190 | 1/1990 | Delgado | 206/335 |
| 4,991,715 | 2/1991 | Williams | 206/335 |

FOREIGN PATENT DOCUMENTS

| | | | |
|---|---|---|---|
| 3934946 | 4/1991 | Fed. Rep. of Germany | 206/335 |
| 891822 | 3/1944 | France | 280/287 |

*Primary Examiner*—Margaret A. Focarino
*Assistant Examiner*—Carla Mattix
*Attorney, Agent, or Firm*—Marks & Murase

[57] ABSTRACT

The bicycle can be disassembled in a compact arrangement, and comprises front and rear foldable subassemblies, and first and second couplers for detachably connecting these front and rear subassemblies together. The couplers connect respectively a front end of the crossbar to the head tube, and a lower end of the down tube to the pedal crank axle housing. The front subassembly includes a down tube having an upper end pivotally connected to the head tube for folding the down tube over the front wheel fork. The rear subassembly includes a seat tube having a lower end pivotally connected to the pedal crank axle housing for folding the seat tube over the chain stay, a crossbar having a rear end connected to an upper end of the seat tube for folding the crossbar over the seat tube, and a seat stay having an upper end detachably connected to the upper end of the seat tube and a pair of legs whose ends are pivotally connected respectively to corresponding ends of a pair of legs of the chain stay such that the seat stay can be folded over the chain stay. The front and rear wheels can be also disassembled in the compact arrangement of the bicycle. A special bag is provided for carrying or storing the bicycle in the compact arrangement.

16 Claims, 8 Drawing Sheets

BICYCLE THAT CAN BE DISASSEMBLED IN A VERY COMPACT ARRANGEMENT

BACKGROUND OF THE INVENTION

1. Field of the Invention

The present invention relates generally to collapsible bicycles, and more particularly to bicycles that can be disassembled for their carrying or storage in bags, for example.

2. Description of the Prior Art

Known in the art is U.S. Pat. No. 4,441,729, which describes a folding bicycle that includes front and rear assemblies that are connected together by a detachable joint at the upper end of the seat tube, and a rotatable joint at the lower end of the seat tube formed with the pedal crank axle housing. So the bicycle can be "folded" by disconnecting the front subassembly at the upper end of the seat tube and then rotating it around the rotatable joint until nesting of both subassemblies. The space took by the bicycle, even though being reduced when the subassemblies are nested, is nevertheless still cumbersome and cannot be carried easily in a bag for instance.

Also known in the art is U.S. Pat. No. 3,608,917, which describes a collapsible bicycle that includes front, middle and rear subassemblies that can be combined to form different bicycle arrangements. In their simplest form, the front subassembly comprises the steering and the front wheel, the middle subassembly comprises the major part of the bicycle's frame and the saddle, and the rear subassembly comprises the rear wheel, the seat stay and the chain stay. It is easy to see that the space reduction when the bicycle is disassembled is not the basic idea of this invention since nothing has been proposed to further reduce the size of the subassemblies, which still take substantial space.

Also known in the art is U.S. Pat. No. 4,756,542, which describes a separable multiple-wheel cycle provided with improved coupling joints for coupling two subassemblies of the cycle and the cables running from one subassembly to the other. However, as in the previous cases, the two subassemblies, even when uncoupled, still take enough space and cannot be easily carried.

Also known in the art is U.S. Pat. No. 4,540,190, which describes a bicycle frame in view of reducing its weight without giving up its robustness, while also giving the possibility of disassembling it into two subassemblies. However, the subassemblies still take space and cannot be easily carried.

Also known in the art is U.S. Pat. No. 4,598,923, which describes a bicycle portable as a bag. The subassemblies of the bicycle are all pivotally connected together such that they can be folded in a relatively compact arrangement, forming a casing. However, the required pivoting joints reduce the overall robustness of the bicycle. Furthermore, such a type of bicycle is limited in terms of size (because the necessity of small wheels for example) and gearing capabilities in order to be efficient and compact.

With respect to bicycle carrying means, known in the art are U.S. Pat. Nos. 3,886,988, 4,149,634, 4,353,464, 4,792,039, 4,892,190 and 4,991,715, which all describe different types of bags, boxes, cases, etc., for transport or storage of bicycles. However, each of these devices are intended for conventional types of bicycle, some of them even requiring to disassemble the bicycle in difficult and tricky ways, all of them being more suitable to protect the bicycle than to easily carrying them.

OBJECT OF THE INVENTION

It is therefore an object of the present invention to provide a bicycle that can be disassembled in a compact arrangement, easily transportable and robust.

Another object of the invention is to provide such a bicycle that has wheels that can be disassembled.

Another object of the invention is to provide such a bicycle that can be easily disassembled with a minimum of tools.

SUMMARY OF THE INVENTION

According to the present invention, there is provided a bicycle that can be disassembled in a compact arrangement, comprising:

(a) a front subassembly including a head tube, a front wheel fork pivotally connected to a lower end of the head tube and downwardly extending therefrom, and a down tube having an upper end pivotally connected to the head tube via first articulation means for folding the down tube over the front wheel fork in the compact arrangement;

(b) a rear subassembly including a chain stay provided with a pedal crank axle housing at its front end, a seat tube having a lower end pivotally connected to the pedal crank axle housing via second articulation means for folding the seat tube over the chain stay in the compact arrangement, a crossbar having a rear end connected to an upper end of the seat tube via third articulation means for folding the crossbar over the seat tube in the compact arrangement, and a seat stay having an upper end detachably connected to the upper end of the seat tube and a pair of legs whose ends are pivotally connected respectively to corresponding ends of a pair of legs of the chain stay such that the seat stay can be folded over the chain stay in the compact arrangement;

(c) first coupling means for detachably connecting a front end of the crossbar to the head tube; and (d) second coupling means for detachably connecting a lower end of the down tube to the pedal crank axle housing;

whereby the bicycle can be disassembled in the compact arrangement by uncoupling the first and second coupling means, by folding the down tube over the front wheel fork, by detaching the upper end of the seat stay from the seat tube, by folding the crossbar over the seat tube, and by folding the seat tube and the seat stay over the chain stay.

Preferably, the bicycle comprises front and rear wheels that can be disassembled in the compact arrangement of the bicycle, each of the front and rear wheels including:

(e) a hub provided with spoke attaching means;

(f) a plurality of arc-rim segments detachably connected to one another by rim attaching means for forming a whole rim, each of the rim segments being provided on its inner contour with straightening means for its reinforcement and spoke attaching means; and (g) a plurality of spokes for interconnecting the rim to the hub, each of the spokes having opposite ends detachably connected to the corresponding rim's spoke attaching means and the hub's spoke attaching means respectively;

whereby each of the front and rear wheels can be disassembled in the compact arrangement of the bicycle by disconnecting the spokes from the corresponding spoke attaching means, and by disconnecting the rim attaching means from the rim segments.

Preferably, the bicycle further comprises a bag for carrying or storing the bicycle in the compact arrangement, the bag including:

(a) a housing formed of a base wall, two opposite side walls, two opposite end walls, and an openable cover, the housing having inner walls for dividing the housing in a plurality of compartments, first and second of the compartments being located along the side walls respectively for enclosing tire elements of the bicycle and the rim segments, a third of the compartments being located between the first and second compartments for enclosing the front and rear subassemblies, and a fourth of the compartments being located along one of the end walls for enclosing the coupling means, the rim attaching means and the spokes;

(b) a pair of casters at an edge of the housing for supporting and carrying the bag when the bag is dragged on ground, and a handle at an opposite end of the housing for dragging the bag;

(c) fastening means for fastening said cover to the housing when the bicycle is carried or stored in the bag; and (d) belt means on one of the side walls of the housing for carrying the bag as a rucksack.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DETAILED DESCRIPTION OF THE PREFERRED EMBODIMENT

In the following description and in the drawings, the same numerals are referring to the same elements.

Figure 1:
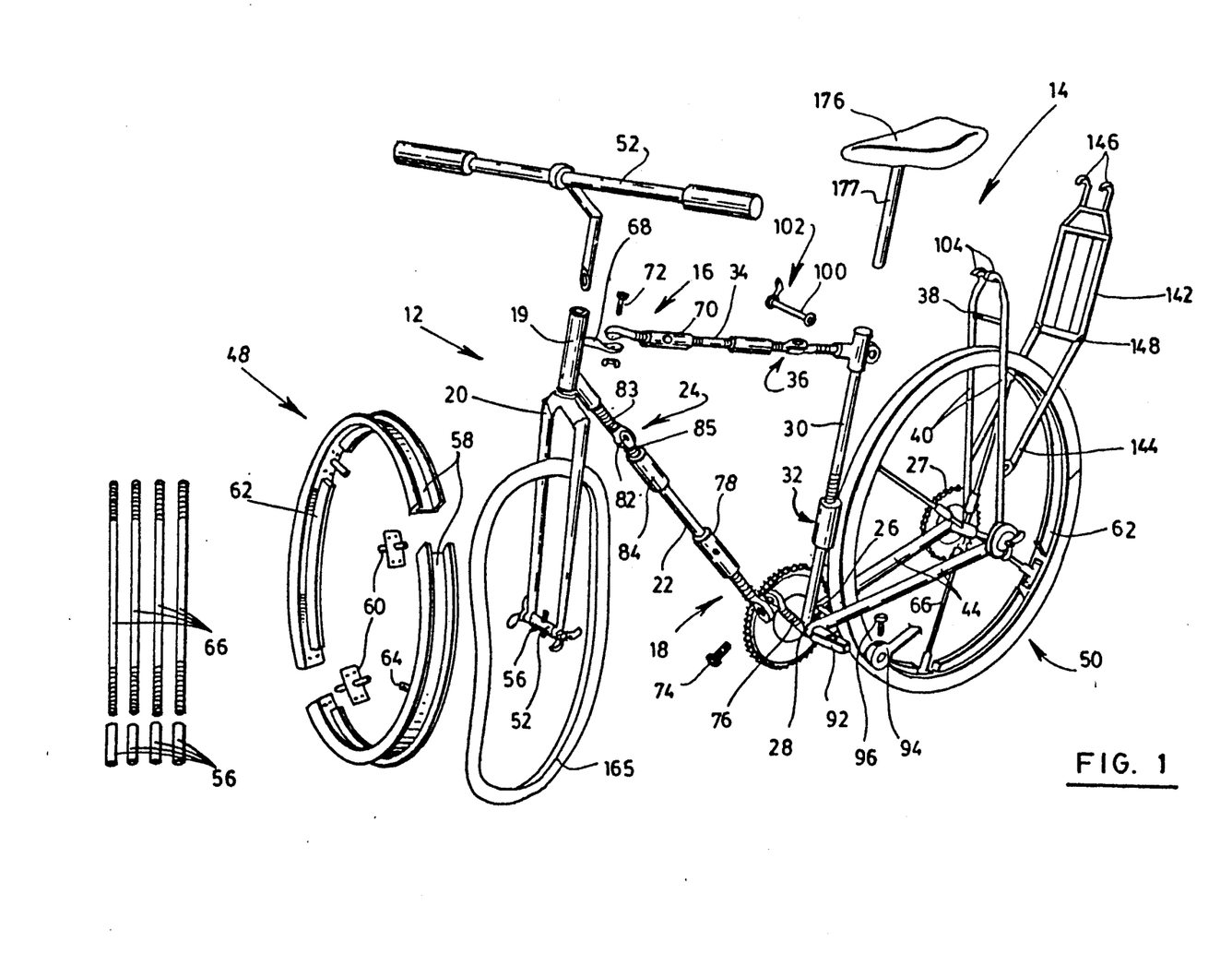
FIG. 1 illustrates a perspective view of a bicycle according to the present invention.

Referring to FIG. 1, the bicycle comprises a front subassembly 12, a rear subassembly 14, and first and second couplers 16 and 18. The front subassembly 12 includes a head tube 19, a front wheel fork 20 pivotally connected to a lower end of the head tube 19 and downwardly extending therefrom, and a down tube 22 having an upper end pivotally connected to the head tube 19 via a first articulation 24 by which the down tube 22 can be folded over the front wheel fork 20 when the bicycle is disassembled in a compact arrangement.

The rear subassembly 14 includes a chain stay 26 provided with a pedal crank axle housing 28 at its front end, a seat tube 30 having a lower end pivotally connected to the pedal crank axle housing 28 via a second articulation 32 by which the seat tube 30 can be folded over the chain stay 26 in the compact arrangement of the bicycle, a crossbar 34 having a rear end connected to an upper end of the seat tube 30 via a third articulation 36 by which the crossbar 34 can be folded over the seat tube 30 in the compact arrangement of the bicycle, and a seat stay 38 having an upper end detachably connected to the upper end of the seat tube 30 and a pair of legs 40 whose ends are pivotally connected respectively to corresponding ends of a pair of legs 44 of the chain stay 26 such that the seat stay 38 can be folded over the chain stay 26 in the compact arrangement of the bicycle.

The first coupler 16 detachably connects a front end of the crossbar 34 to the head tube 19, while the second coupler 18 detachably connects a lower end of the down tube 22 to the pedal crank axle housing 28.

In the compact arrangement of the bicycle, the couplers 16, 18 are uncoupled for separating the front subassembly 12 from the rear subassembly 14.

Figures 2, 3:
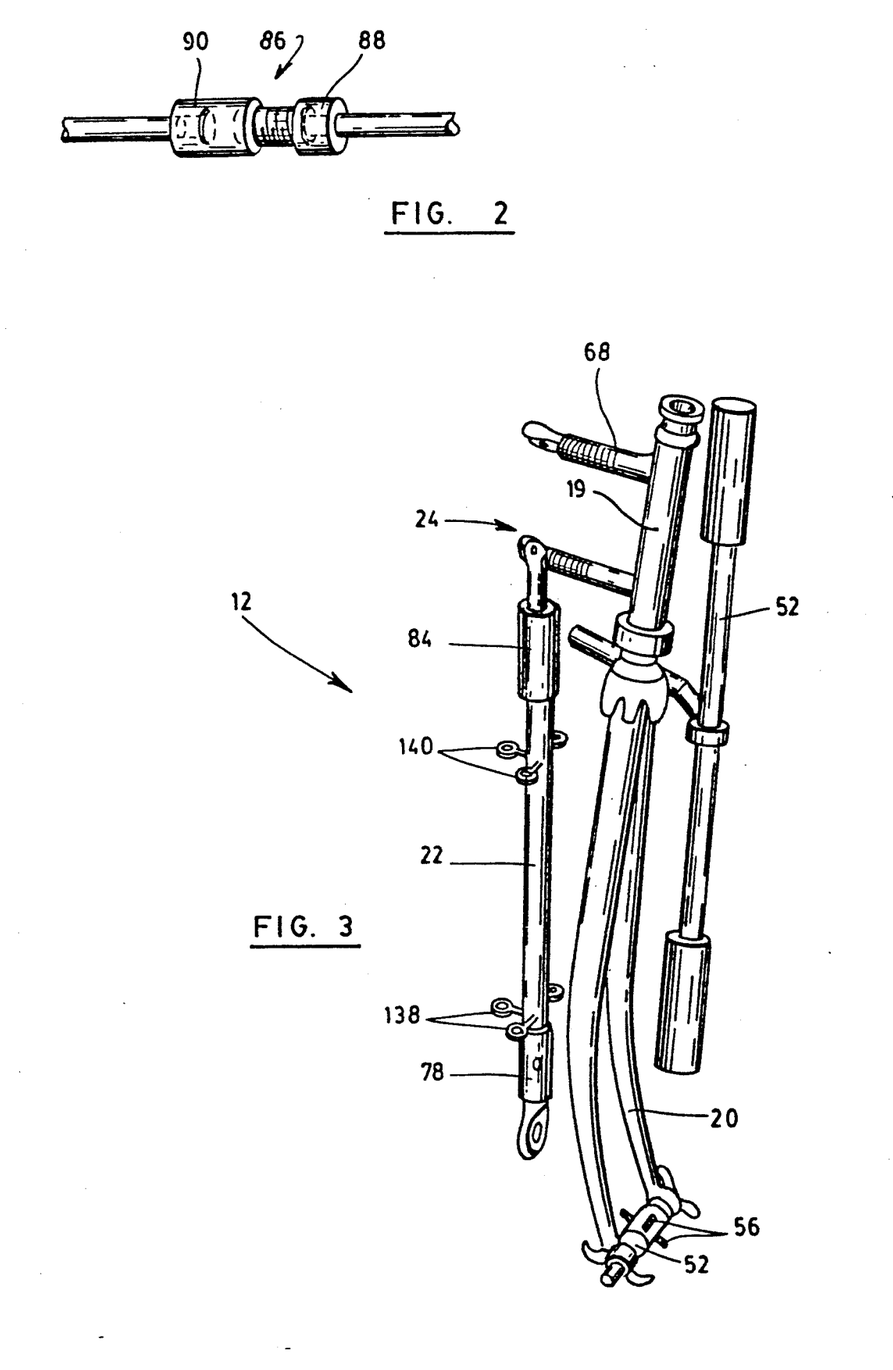
FIG. 2 illustrates a cable coupler for the bicycle shown in FIG. 1.
FIG. 3 illustrates the front subassembly of the bicycle shown in FIG. 1, in a compact arrangement.

Referring to FIG. 3, in the compact arrangement of the bicycle, the space took by the front subassembly 12 is further reduced by folding the down tube 22 over the front wheel fork 20 and by removing the handle bar 52 from the head tube 19 in order to set the handle bar 52 beside the front wheel fork 20 without requiring any difficult operation.

Figure 4:
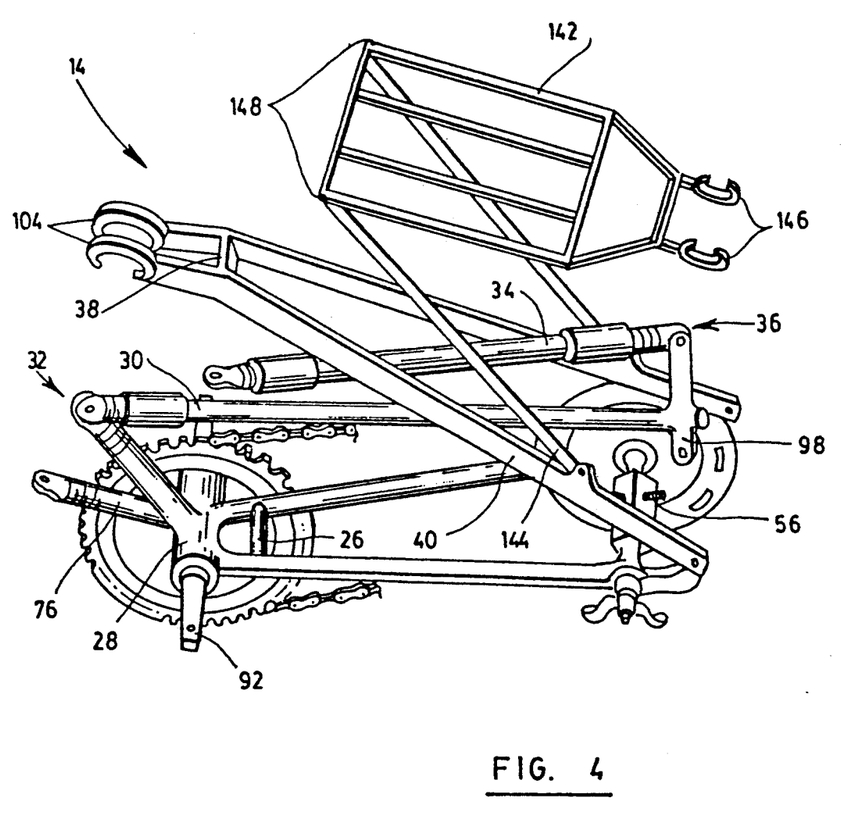
FIG. 4 illustrates the rear subassembly of the bicycle shown in FIG. 1, in a compact arrangement.

Referring to FIG. 4, in the compact arrangement of the bicycle, to further reduce the space took by the rear subassembly 14, the upper end of the seat stay 38 is disconnected from the seat tube 30 (or more specifically from lugs 98 of the seat tube 30), the crossbar 34 is folded over the seat tube 30, and the seat tube 30 and the seat stay 38 are folded over the chain stay 26.

Referring again to FIG. 1, the front and the rear wheels 48, 50 can be also disassembled in the compact arrangement of the bicycle. The front wheel 48 (to which the following references will be made) and the rear wheel 50 have both a hub 52 provided with four spoke fasteners 56 (better shown in FIGS. 3 and 4) equidistantly located around the contour of the hub 52 at its center. Each of the front and rear wheels 48, 50 includes a pair of arc-rim segments 58 that can be detachably connected together by rim fasteners 60 for forming a whole rim. Each of the rim segments 58 is provided with straightening flanges 62 for its reinforcement, and spoke fasteners 64 (among which two are on the rim fasteners 60) on its inner contour. Each of the front and rear wheels 48, 50 also includes four spokes 66 that interconnect their corresponding rim to their corresponding hub 52. Each of the spokes 66 has opposite ends detachably connected to the corresponding rim's spoke fastener 64 and the hub's spoke fastener 56 respectively. Therefore, each of the front and rear wheels 48, 50 can be disassembled in the compact arrangement of the bicycle by disconnecting the spokes 66 from the corresponding spoke fasteners 56, 64, and by disconnecting the rim fasteners 60 of the rim segments 58.

The head tube 19 is provided with a first member 68 that projects rearwardly and has an end adapted to be connected to the front end of the crossbar 34 for their coupling. The end of the first member 68 and the end of the crossbar 34 have both a threaded portion and an ending flat portion with a socket therethrough, so that the flat portions of the first member 68 and the crossbar 34 can be juxtaposed to one another while having their respective socket aligned. The first coupler 16 comprises a first elongated bushing 70 for detachably connecting together the end of the first member 68 with the front end of the crossbar 34, and first bolting means 72 for securing the first bushing 70 with the first member 68 and the crossbar 34. The first bushing 70 has a threaded inner surface for threaded engagement with the threaded portion of the first member 68 at a first end and the threaded portion of the crossbar 34 at an opposite end, and a pair of coaxially aligned sockets to be aligned with the sockets of the first member 68 and the crossbar 34 for forming a passage in which the bolting means 72 can be fitted in for preventing the first bushing 70 to rotate.

Similarly, the pedal crank axle housing 28 is provided with a second member 76 having an end adapted to be connected to the lower end of the down tube 22 for their coupling. The end of the second member 76 and the lower end of the down tube 22 have both a threaded portion and an ending flat portion with a socket therethrough. The second coupler 18 comprises a second elongated bushing 78 for detachably connecting together the end of the second member 76 with the lower end of the down tube 22, and second bolting means 74 for securing the second bushing 78 with the second member 76 and the down tube 22. The second bushing 78 has a threaded inner surface for threaded engagement with the threaded portion of the second member 76 at a first end and the threaded portion of the down tube 22 at an opposite end, and a pair of coaxially aligned sockets to be aligned with the sockets of the second member 76 and the down tube 22 for forming a passage in which the bolting means 74 can be fitted in for preventing the second bushing 78 to rotate.

Each of the first, second and third articulations 24, 32, 36 comprises a hinge 82 (shown for the first articulation) from which extends two threaded members 83, 85 formed by the corresponding articulated tubing, and an elongated bushing 84 having a threaded inner surface for threaded engagement with both of the threaded members 83, 85 at opposite ends when these threaded members 83, 85 are coaxially aligned.

Since each of the subassemblies 12, 14 is separated from one another in the compact arrangement of the bicycle, each of the cables running from the front subassembly 12 to the rear subassembly 14, such as the rear brake cable and the speed cables, is provided with a cable coupler 86 (shown is FIG. 2) for detachably coupling a portion of the corresponding cable located on the front subassembly 12 with another portion of the corresponding cable located on the rear subassembly 14.

Referring to FIG. 2, each of the cable couplers 86 is located at extremities of the cable's portions to be connected together respectively, and has a male threaded connector 88 to be in a threaded engagement with a female threaded connector 90 for connecting together the extremities. Therefore, to disconnect each extremity of the cable, the male connector 88 and the female connector 90 are simply unscrewed from one another. Such a kind of cable coupler 86 has the advantage to allow an adjustment of the cable stretch in a very simple manner.

Referring again to FIG. 1, the rear subassembly 14 also comprises a pedal crank axle 92 rotatably mounted in the pedal crank axle housing 28. The axle 92 has opposite ends extending outside the pedal crank axle housing 28 on both sides of the bicycle respectively, each of the axle's ends having a socket therethrough extending perpendicularly to a center axis of the axle 92 for allowing to secure a pedal crank 94 to the corresponding axle's end by means of a bolt 96 fitted in the socket of the corresponding axle's end.

Figure 7:
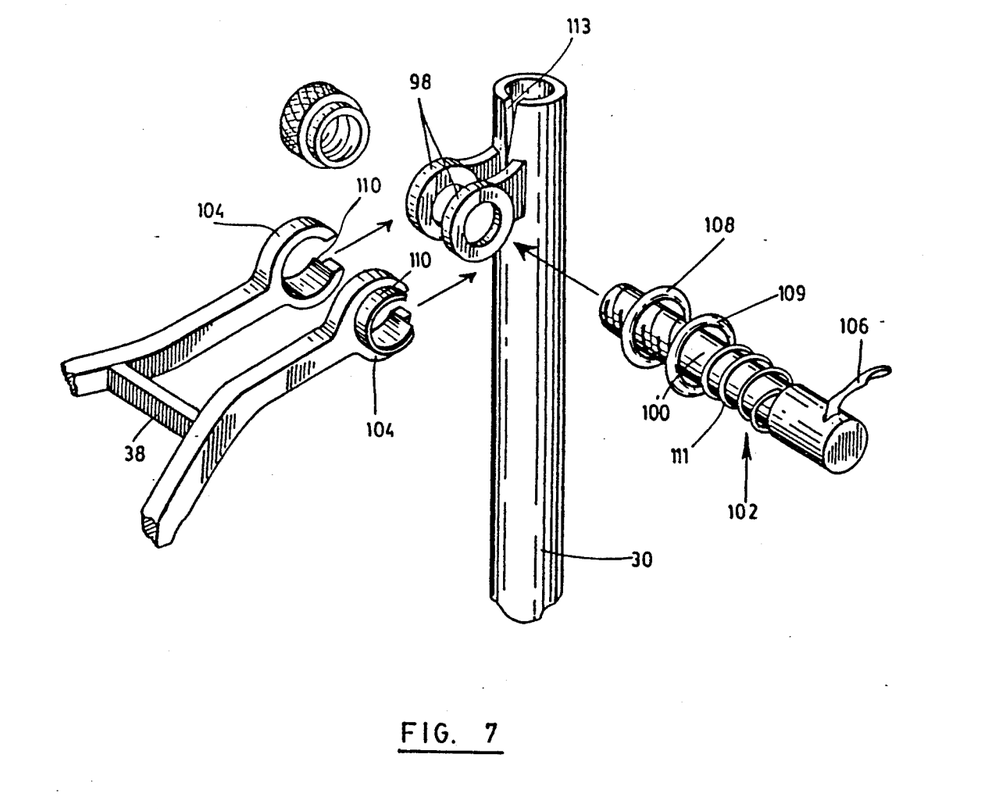
FIG. 7 illustrates an exploded view of the quick release key that secures the seat stay to the seat tube shown in FIG. 1.

Referring now to FIG. 7, the upper end of the seat tube 30 is provided with a pair of rearwardly extending lugs 98 for supporting a rod 100 of a quick release key 102. The upper end of the seat stay 38 is provided with a fork having a pair of hooks 104 to be affixed respectively to the rod 100 on both sides of the pair of lugs 98 such that the pair of hooks 104 may be secured by moving a lever 106 of the quick release key 102. To detach the seat stay 38 from the seat tube 30 in the compact arrangement of the bicycle, a simple release of the lever 106 of the quick release key 102 is required. A saddle post 177 (shown in FIG. 1) can be tightened in the seat tube 30 also upon the action of the quick release key 102 as a result of the expansion slot 113 at the upper end of the seat tube 30. The rod 100 of the quick release key 102 is provided with two rings 108, 109 adapted to be fitted around corresponding flanges 110 on the outer lateral surface of each of the hooks 104, in such a way that the hooks 104 cannot be detached from the rod 100 while the rings 108, 109 are around the flanges 110. Removal of these rings 108, 109 from the flanges 110 can only be done when the lever 106 of the quick release key 102 is in a release position. Springs 111 (the left hand one is not shown) ensure that the rings 108, 109 are in position around the flanges 110 and cannot be detached thereof by themselves.

Figure 5:
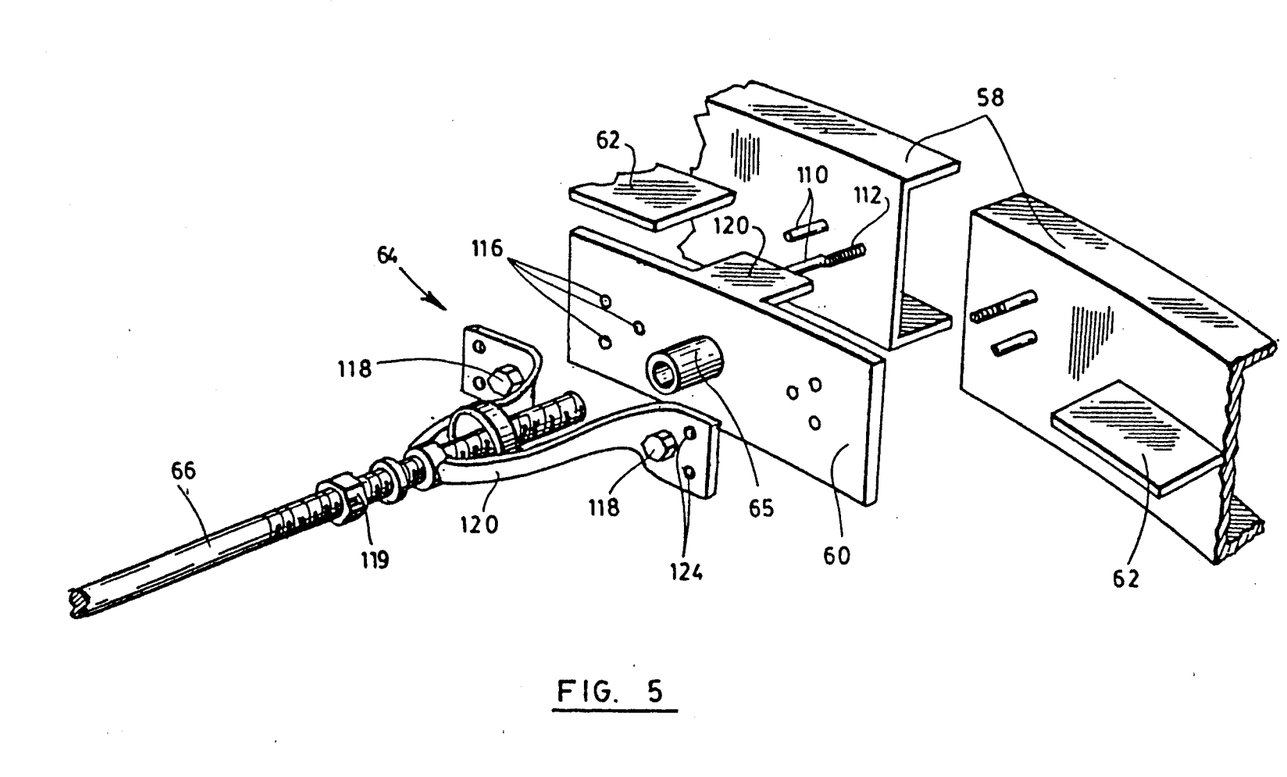
FIG. 5 illustrates an exploded view of one of the rim's fastener and one of the rim's spoke fastener shown in FIG. 1.

Referring to FIG. 5, each of the rim's spoke fasteners 64 comprises a socket 65 extending perpendicularly to the inner contour of the corresponding rim segments 58 (or on the rim fastener 60). The socket 65 has a threaded inner surface for bolting purpose. Each of the spoke's ends has also a threaded outer surface for threaded engagement of one end with the threaded surface of the corresponding socket 65. Each of the straightening flanges 62 for reinforcement of the rim segments 58 extends along a median portion of these rim segments 58 and projects perpendicularly thereto. Each of the rim segments 58 has ends provided with a pair of spaced apart pins 110 and a bolt 112 that project perpendicularly to the inner contour of the corresponding rim segments 58. Each of the rim fasteners 60 is a thin plate having two opposite portions with sockets therethrough 116 for fitting in the pins 110 and the bolt 112 of the two corresponding rim segments 58 to be connected together. The nuts 118 can be therefore bolted on the bolts 112 for securing the plate (60) to the two corresponding rim segments 58. Preferably, each of the rim fasteners 60 are also provided with a pair of lateral spacers 120 projecting perpendicularly to the corresponding plate (60) for producing a spacing between the ends of the corresponding rim segments 58 in order to ease the disassembly of the wheels 48, 50 (shown in FIG. 1). To further straighten the fixation of the spokes 66 to the rim's spoke fasteners 64, there is provided a stirrup 120 having a socket in which the corresponding spoke 66 can be tightly fitted in, the stirrup 120 having legs with sockets 124 therethrough that can be operatively aligned with the sockets 116 of the corresponding rim fastener 60 in order to be connected thereto in a same way that the latter is connected to the corresponding rim segments 58. The spoke 66 and the stirrup 120 are also secured together by a bolt 119 to be screwed until its abutment against the stirrup 120.

Figure 6:
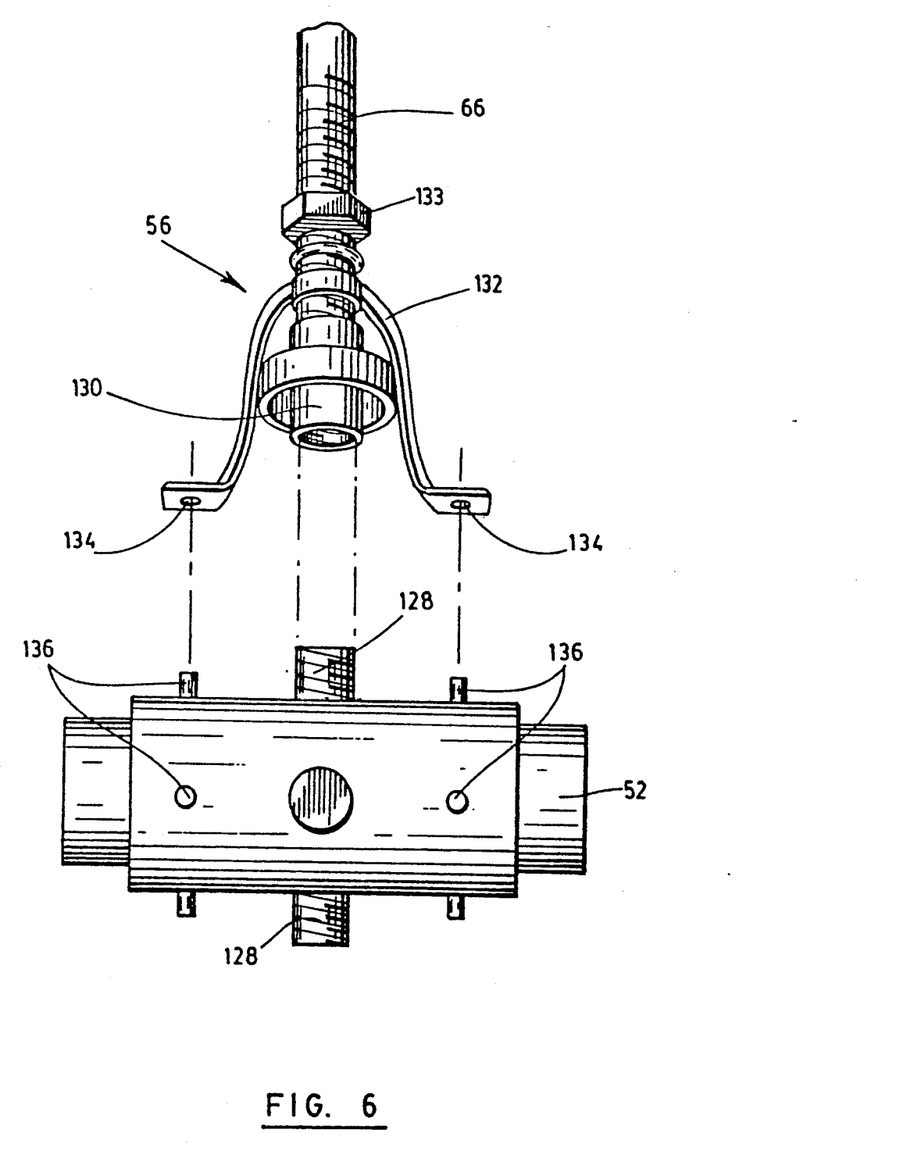
FIG. 6 illustrates an exploded view of one of the hub of the bicycle shown in FIG. 1, with one of the hub's spoke fastener.

Referring to FIG. 6, each of the hub's spoke fasteners 56 comprises a rod 128 extending perpendicularly to an axis of rotation of the corresponding hub 52 and has a threaded outer surface for bolting purpose. Each of these hub's spoke fasteners 56 also comprises a bushing 130 having a threaded inner surface for threaded engagement with the threaded surface of the corresponding rod 128 at an end, the opposite end being in threaded engagement with the corresponding end of the spoke 66 to connect to the hub 52. The hub's spoke fastener 56 may also comprise a stirrup 132 having a pair of legs whose ends have sockets 134 in which corresponding pins 136 on the hub 52 can be fitted in. The spoke 66 can be therefore tightly fitted in the socket of the stirrup 132 for straightening its connection thereto with a bolt 133.

Referring again to FIGS. 3 and 4, the lower end of the down tube 22 and the crank axle housing 28 may be both provided with cable guides 138 (not shown for the crank axle housing 28) for guiding each cable running from the front subassembly 12 to the rear subassembly 14. By locating the cable couplers 86 (shown in FIG. 2) between the cable guides 138 of both subassemblies 12, 14, the extremities of the cable portions can be held in place when disconnected instead of being free to move. Other cable guides 140 can be further added as near the articulation 24 for example for also guiding or holding the cables whether when the bicycle is assembled or not.

Referring to FIGS. 1 and 4, the bicycle can be further equipped with an optional luggage rack 142 mounted on the rear subassembly 14. The luggage rack 142 has a pair of lower ends 144 pivotally connected to the pair of legs 40 of the seat stay 38, and an upper end provided with a pair of hooks 146 to be affixed respectively to the quick release key's rod 100 on outer sides of the seat stay's pair of hooks 104 and secured by the quick release key 102. This connection can be done exactly in a same way and with similar elements to the elements 108, 109 and 110 (shown in FIG. 7 for the seat stay 38) applied to the luggage rack 142. The luggage rack 142 has also pivots 148 for its folding over the seat stay 38 in the compact arrangement of the bicycle.

Figure 8:
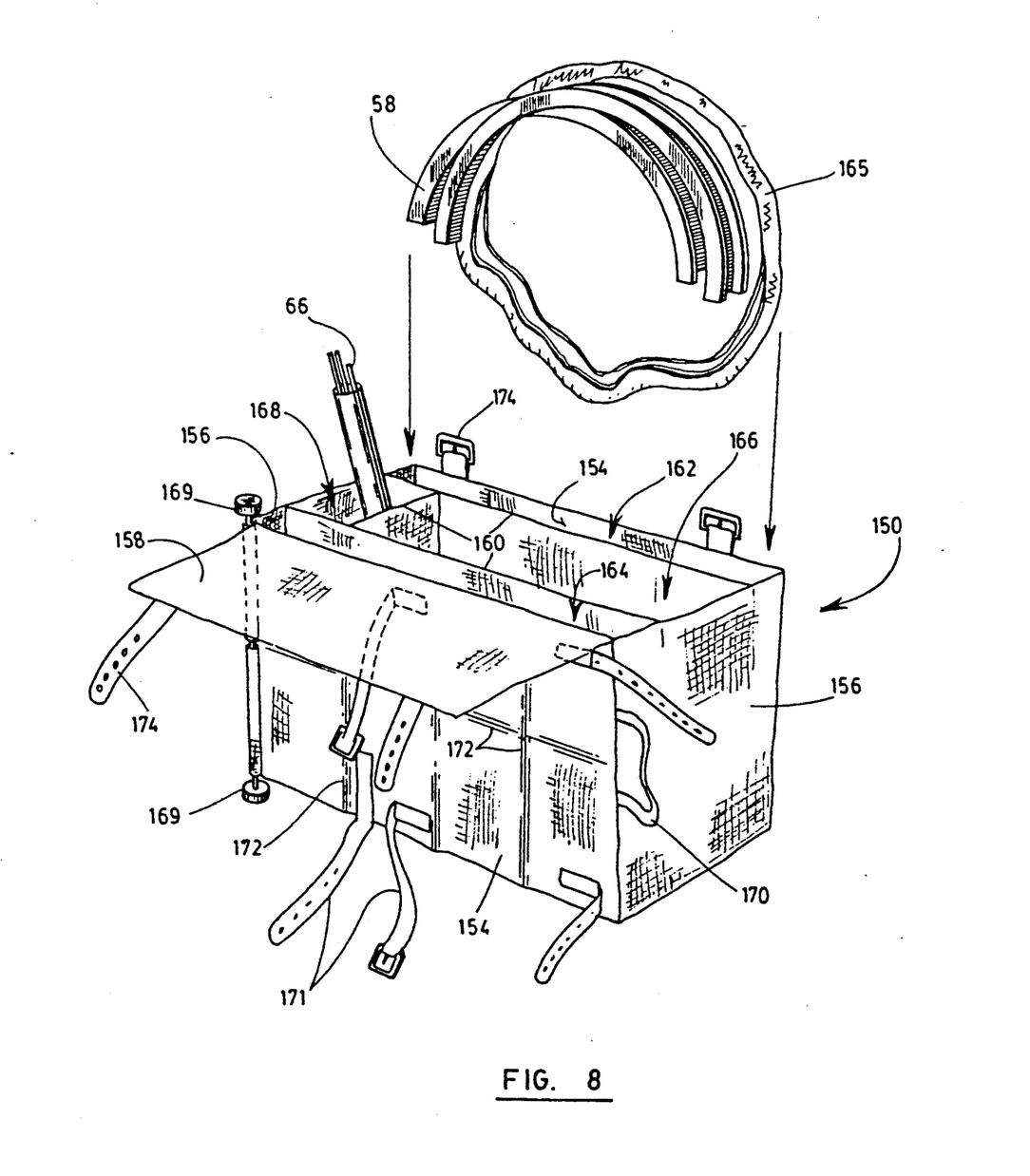
FIG. 8 illustrates a special bag for carrying or storing the bicycle shown in FIG. 1.
Figure 9:
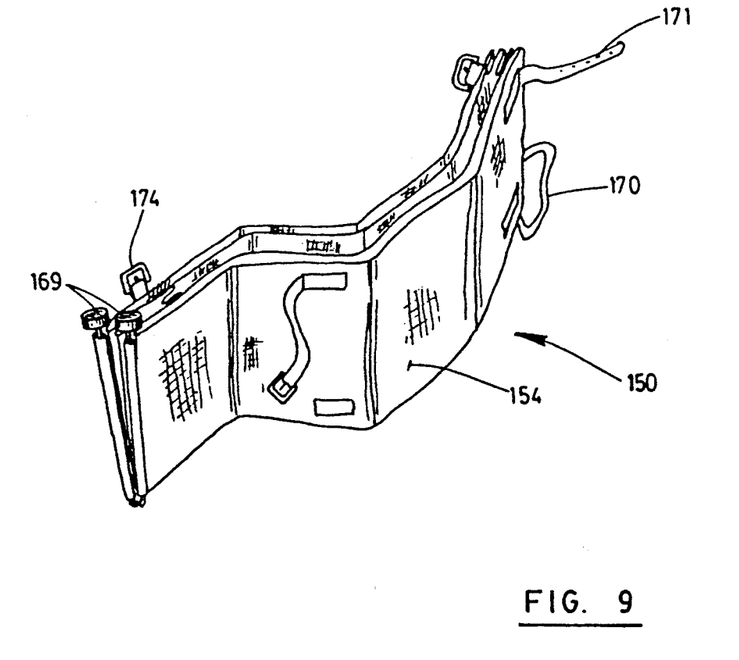
FIG. 9 illustrates the bag of FIG. 8 in a folded arrangement.

Referring to FIG. 8, a special bag 150 is provided for carrying or storing the bicycle (shown in FIG. 1) in its compact arrangement. The bag 150 comprises a housing formed of a base wall (hidden), two opposite sidewalls 154, two opposite end walls 156, and an openable cover 158. The housing has inner walls 160 for dividing it in a plurality of compartments. First and second of these compartments 162, 164 are located along the sidewalls 154 respectively for enclosing the tire elements 165 of the bicycle (shown in FIG. 1) and the rim segments 58. A third of these compartments 166 is located between the first and second compartments 162 and is used for enclosing the front and rear subassemblies 12, 14 (shown in FIGS. 3 and 4) in their compact arrangement. The fourth of these compartments 168 is located along one of the end walls 156 for enclosing the couplers 16, 18, the rim fasteners 60 and the spokes 66 (all shown in FIG. 1), and any other loose element of the bicycle when disassembled. A pair of casters 169 at an edge of the bag's housing provides a way for supporting and carrying the bag 150 when it is dragged on the ground, by means of a handle 170 located at the opposite end of the housing. Alternatively, the bag 150 can be carried as a rucksack, with the belts 171 provided for this purpose on one of the sidewalls 154 of the housing. Each of the walls 154, 156 and the cover 158 is formed of many pieces of substantially rigid material that are linked to one another by foldable links 172, such that the bag 150 can be folded as shown in FIG. 9 when empty.

Referring to FIGS. 1 and 8, to disassemble the bicycle and put it in the bag 150, the bolting means 72, 74 are removed from the coupler's sockets in order to unscrew the couplers 16, 18 from the first and second members 68, 76 respectively. Each of the cable's couplers 86 (shown in FIG. 2) are also uncoupled for allowing the separation of the front and rear subassemblies 12, 14. The front wheel 48 is unfastened from the front wheel fork 20 and temporarily set apart. The bushings 84 of the articulations 24, 32, 36 are unscrewed for allowing their movement. The handle bar 52 of the bicycle is detached from the head tube 19 to be set beside the front wheel fork 20 as shown in FIG. 3. The down tube 22 is folded down over the front wheel fork 20. Before putting the front subassembly 12 in its predetermined compartment 166 of the bag 150, the hub's spoke fasteners 56 of the front wheel 48 are detached for releasing the hub 52 in order to put it back on the front wheel fork 20. The spokes 66 are then detached from the front wheel's rim segments 58 and put in their predetermined compartment 168 of the bag 150. The rim's spoke fasteners 60 are detached from the rim segments 58 and also put in the compartment 168. The front tire elements 165 are deflated and the two rim segments 58 are removed and set, with the front tire elements 165, in the compartment 162. For the rear wheel 50, the same operations are executed however without the corresponding hub 56 being totally detached from the chain stay 26. To remove the rear tire elements, only the connected portion of the hub 56 opposite to the free wheel 27 of the bicycle has to be temporarily detached to allow the passage of the rear tire elements. The rear tire elements and the two rim segments 58 are put in the other bag's compartment 164. Afterwards, the quick release key 102 is released and the saddle 176 is put in the bag 150. The luggage rack 142 and the seat stay 38 are swung backwardly as shown in FIG. 1. The crossbar 34 is folded over the seat tube 30 which at its turn is folded over the chain stay 26. The seat stay 38 is then also folded over the chain stay 26 and the luggage rack 142 over the seat stay 38, as shown in FIG. 4. Finally, the pedal cranks 94 are detached from the pedal crank axle 92, and the rear subassembly 14 and the pedal cranks 94 are put in the bag 150. After having closed the cover 158 of the bag 150 with the straps 174, the bag 150 can be whether pulled or put as a rucksack.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. A bicycle that can be disassembled in a compact arrangement, comprising:

(a) a front subassembly including a head tube, a front wheel fork pivotally connected to a lower end of said head tube and downwardly extending therefrom, and a down tube having an upper end pivotally connected to said head tube via first articulation means for folding said down tube over said front wheel fork in said compact arrangement;

(b) a rear subassembly including a chain stay provided with a pedal crank axle housing at its front end, a seat tube having a lower end pivotally connected to said pedal crank axle housing via second articulation means for folding said seat tube over said chain stay in said compact arrangement, a crossbar having a rear end connected to an upper end of said seat tube via third articulation means for folding said crossbar over said seat tube in said compact arrangement, and a seat stay having an upper end detachably connected to said upper end of the seat tube and a pair of legs whose ends are pivotally connected respectively to corresponding ends of a pair of legs of said chain stay such that said seat stay can be folded over said chain stay in said compact arrangement;

(c) first coupling means for detachably connecting a front end of said crossbar to said head tube; and (d) second coupling means for detachably connecting a lower end of said down tube to said pedal crank axle housing;

whereby said bicycle can be disassembled in said compact arrangement by uncoupling said first and second coupling means, by folding said down tube over said front wheel fork, by disconnecting said upper end of the seat stay from said seat tube, by folding said crossbar over said seat tube, and by folding said seat tube and said seat stay over said chain stay.

2. A bicycle according to claim 1, comprising front and rear wheels that can be disassembled in said compact arrangement of the bicycle, each of said front and rear wheels including:

(e) a hub provided with spoke attaching means;

(f) a plurality of arc-rim segments detachably connected to one another by rim attaching means for forming a whole rim, each of said rim segments being provided on its inner contour with straightening means for its reinforcement and spoke attaching means; and (g) a plurality of spokes for interconnecting said rim to said hub, each of said spokes having opposite ends detachably respectively connected to the corresponding rim's spoke attaching means and the hub's spoke attaching means;

whereby each of said front and rear wheels can be disassembled in said compact arrangement of the bicycle by disconnecting said spokes from the corresponding spoke attaching means, and by disconnecting said rim attaching means from said rim segments.

3. A bicycle according to claim 1, wherein:

(i) said head tube is provided with a first member having an end adapted to be connected to said front end of the crossbar, said end of the first member and said front end of the crossbar having both a threaded portion and an ending flat portion with a socket therethrough;

(ii) said pedal crank axle housing is provided with a second member having an end adapted to be connected to said lower end of the down tube, said end of the second member and said lower end of the down tube having both a threaded portion and an ending flat portion with a socket therethrough;

(iii) said first coupling means comprise a first elongated bushing for detachably connecting together said end of the first member with said front end of the crossbar, and first bolting means for securing said first bushing with said first member and said crossbar, said first bushing having a threaded inner surface for threaded engagement with said threaded portion of the first member at an end and said threaded portion of the crossbar at an opposite end, and a pair of coaxially aligned sockets to be aligned with said sockets of the first member and the crossbar for forming a passage in which said bolting means can be fitted in for preventing said first bushing to rotate; and (iv) said second coupling means comprise a second elongated bushing for detachably connecting together said end of the second member with said lower end of the down tube, and second bolting means for securing said second bushing with said second member and said down tube, said second bushing having a threaded inner surface for threaded engagement with said threaded portion of the second member at an end and said threaded portion of the down tube at an opposite end, and a pair of coaxially aligned sockets to be aligned said sockets of the second member and the down tube for forming a passage in which said bolting means can be fitted in for preventing said second bushing to rotate.

4. A bicycle according to claim 1, wherein each of said first, second and third articulations means comprises a hinge from which extends two threaded members, and an elongated bushing having a threaded inner surface for threaded engagement with both of said threaded members at opposite ends when said threaded members are coaxially aligned.

5. A bicycle according to claim 1, comprising a cable coupler for each cable running from one of said subassemblies to the other, for detachably coupling a portion of the corresponding cable located on said front subassembly with another portion of the corresponding cable located on said rear subassembly, said cable coupler being located at extremities of the cable's portions to be connected together respectively and having a male threaded connector to be in a threaded engagement with a female threaded connector for connecting together said extremities, whereby the cable's portions can be uncoupled by unscrewing said male connector and said female connector from one another in said compact arrangement of the bicycle.

6. A bicycle according to claim 1, wherein said rear subassembly comprises a pedal crank axle rotatably mounted in said pedal crank axle housing, said axle having opposite ends extending outside said pedal crank axle housing on both sides of said bicycle respectively, each of the axle's ends having a socket therethrough extending perpendicularly to a center axis of said axle such that bolting means can be fitted in the socket for securing a pedal crank to the corresponding axle's end.

7. A bicycle according to claim 1, wherein:

(i) said upper end of the seat tube is provided with a pair of rearwardly extending lugs for supporting a rod of a quick release key; and (ii) said upper end of the seat stay is provided with a fork having a pair of hooks to be affixed respectively to said rod on both sides of said pair of lugs such that said pair of hooks can be secured by moving a lever of said quick release key;

whereby said seat stay can be disconnected from said seat tube in said compact arrangement of the bicycle by a release of the lever of said quick release key.

8. A bicycle according to claim 7, wherein:
(i) said rod of the quick release key is provided with two rings; and
(ii) each of said hooks of the seat stay has an outer lateral surface provided with an arcuate flange around which the corresponding ring is mounted for preventing the corresponding hook to detach from said rod without first removing said rings from said flanges in said compact arrangement of the bicycle.

9. A bicycle according to claim 2, wherein:
(i) each of the rim's spoke attaching means comprises a socket extending perpendicularly to said inner contour of the corresponding rim segment, each of said sockets having a threaded inner surface;
(ii) each of said hub's spoke attaching means comprises a rod extending perpendicularly to an axis of rotation of the corresponding hub and having a threaded outer surface, and a bushing having a threaded inner surface for threaded engagement with said threaded surface of the corresponding rod at a first end;
(iii) each of the spoke's ends has a threaded outer surface for threaded engagement with said threaded surfaces of the corresponding socket and a second end of the corresponding bushing, whereby said spokes can be unscrewed from said sockets and said bushings respectively in said compact arrangement of the bicycle.

10. A bicycle according to claim 2, wherein:
(i) each of said straightening means is an elongated member extending along a median portion of the corresponding rim segment and projecting perpendicularly thereto;
(ii) each of said rim segments has ends provided with a pair of spaced apart pins and a bolt that project perpendicularly to the inner contour of the corresponding rim segment;
(iii) each of said rim attaching means comprises a thin plate having two opposite portions with sockets therethrough for fitting in said pins and said bolts of the two corresponding rim segments to be connected together such that nuts can be bolted on said bolts for securing the plate to the two corresponding rim segments.

11. A bicycle according to claim 10, wherein each of said rim attaching means is provided with a pair of lateral spacers projecting perpendicularly to the corresponding plate for producing a spacing between the ends of the corresponding rim segments.

12. A bicycle according to claim 5, wherein said lower end of the down tube and said pedal crank housing are both provided with cable guiding means for guiding each cable running from one of said subassemblies to the other, each cable coupler being located between said guiding means of the down tube and the pedal crank axle housing.

13. A bicycle according to claim 7, wherein said rear subassembly includes a foldable luggage rack having a pair of lower ends pivotally connected to said pair of legs of the seat stay, and an upper end provided with a pair of hooks to be affixed respectively to the quick release key's rod on both outer sides of the seat stay's pair of hooks, and to be secured by said quick release key, whereby said pair of hooks of the luggage rack can be disconnected from the quick release key's rod for folding said luggage rack over said seat stay in said compact arrangement of the bicycle.

14. A bicycle according to claim 10, wherein each of the spoke attaching means comprises a stirrup having a socket in which the corresponding spoke can be tightly fitted in and firmly held.

15. A bicycle according to claim 2, further comprising a bag for carrying or storing said bicycle in said compact arrangement, said bag including:
(a) a housing formed of a base wall, two opposite side walls, two opposite end walls, and an openable cover, said housing having inner walls for dividing said housing in a plurality of compartments, first and second of said compartments being located along said side walls respectively for enclosing tire elements of said bicycle and said rim segments, a third of said compartments being located between said first and second compartments for enclosing said front and rear subassemblies, and a fourth of said compartments being located along one of said end walls for enclosing said coupling means, said rim attaching means and said spokes;
(b) a pair of casters at an edge of said housing for supporting and carrying said bag when said bag is dragged on ground, and a handle at an opposite end of said housing for dragging said bag;
(c) fastening means for fastening said cover to said housing when said bicycle is carried or stored in said bag; and
(d) belt means on one of said side walls of the housing for carrying said bag as a rucksack.

16. A bicycle according to claim 15, wherein each of said walls and said cover is formed of a plurality of pieces of a substantially rigid material that are linked to one another by foldable links, such that said bag can be folded when empty.

* * * * *